July 25, 1961
B. J. BROMAN
2,993,270
METHOD OF AND APPARATUS FOR WELDING CHANNEL SECTION STRIPS
Filed Nov. 25, 1957
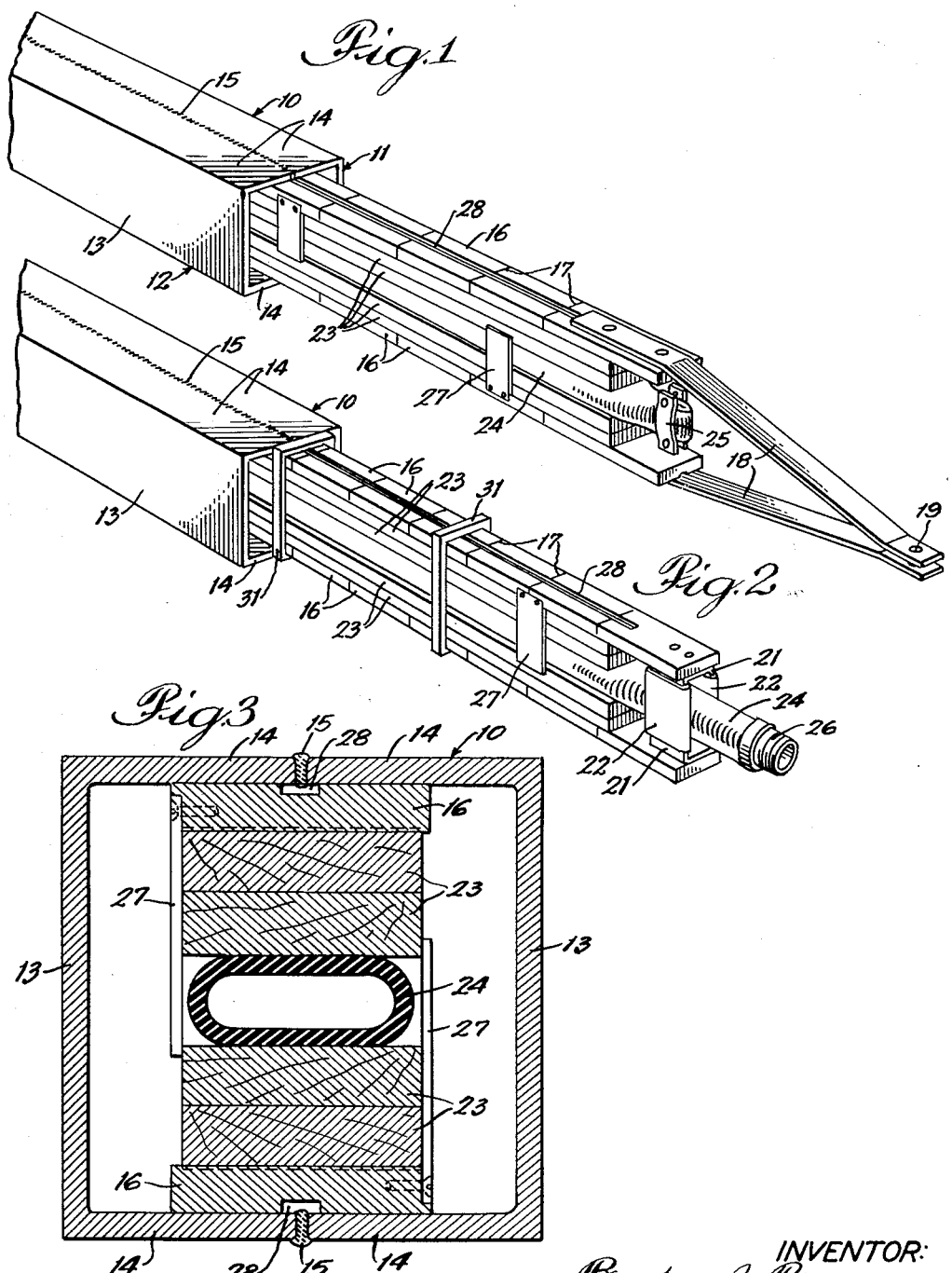
INVENTOR:
Burton J. Broman,
BY
ATTORNEYS.

United States Patent Office 2,993,270
Patented July 25, 1961

2,993,270
METHOD OF AND APPARATUS FOR WELDING CHANNEL SECTION STRIPS

Burton J. Broman, Park Forest, Ill., assignor to Union Asbestos & Rubber Company, Blue Island, Ill., a corporation of Illinois
Filed Nov. 25, 1957, Ser. No. 698,780
3 Claims. (Cl. 29—463)

This invention relates to a method of and apparatus for welding channel section strips and more particularly to the manufacture of hollow box section beams from channel section strips.

Beams of rectangular or box section have heretofore been manufactured extensively by assembling a pair of channel section strips with the edges of their flanges facing and welding the edges of the flanges together in elongated seams. In practicing this method the channel section strips have been held together by fixtures and the seam at one side has been welded after which the beam is reversed and the seam at the other side is welded.

In this operation, a great deal of difficulty has been encountered in keeping the beam straight due to bending or deflection thereof during the welding. It has been found, for example, that in a 24 foot beam of ¼ inch steel, approximately 4 inches square, the initial welding of the first seam will produce a total deflection throughout the length of the beam on the order of 1½ inch to 2 inches. When the opposite seam is welded, about 75% to 80% of the initial deflection is recovered, but the beam is left with a permanent deflection of ½ inch or more, which is unsatisfactory.

To eliminate this residual or permanent deflection, it has heretofore been necessary to prestress or prebend the channel section strips. If exactly the correct degree of prestressing is used, straight beams will result. However, there is always some non-uniformity in the metal and prestressing is not only expensive and difficult to accomplish, but still does not always produce a straight beam.

It is accordingly one of the objects of the present invention to provide a method of and apparatus for welding channel section strips by which straight beams are uniformly produced without prestressing.

Another object is to provide a method and apparatus for welding strips in which the flanges of the channel section strips are subjected to uniform outward pressure during welding of the seams to eliminate permanent deflection.

According to a feature of the invention, the flanges of the channel section strips are engaged at their inner surfaces by elongated metal strips which are urged outwardly against the flanges during the welding operations. The metal strips are preferably cross-scored for flexibility and are formed with grooves in their outer surfaces registering with the seams to vent gases during welding. Such strips not only eliminate residual deflection in the finished beam, but also serve as a jig to hold the channel section strips properly assembled during welding.

Another object is to provide a method and apparatus in which pressure is applied pneumatically to the metal strips to urge them against the flanges of the channel section strips.

According to a feature of the invention, strips of wood or similar heat insulating material are assembled between the inner surfaces of the metal strips and an inflatable tube which lies between the wood strips on opposite sides to urge them apart. The metal and wood strips are connected by guide means which limit lateral separation thereof while permitting separation in planes perpendicular to the strips.

The above and other objects and features of the invention will be more readily apparent from the following description when read in connection with the accompanying drawing, in which:

FIGURE 1 is a partial perspective view of an apparatus embodying the present invention partially assembled in a beam;

FIGURE 2 is a view similar to FIGURE 1 looking from the opposite end and

FIGURE 3 is an enlarged transverse section through the beam and pressure applying apparatus.

The present invention relates to the manufacture of rectangular section hollow beams formed of a pair of channel-shaped strips welded together in elongated seams on the opposite sides of the beam. As shown, a generally square beam, indicated at 10, is formed by a pair of channel section strips 11 and 12. Each of the strips 11 and 12 has a center web portion 13 and side flanges 14 and the strips are assembled with the edges of the side flanges facing each other. The flanges are welded together edge-to-edge in the form of elongated welded seams, as shown at 15, to form the completed beam 10.

The apparatus of the present invention is adapted to hold the channel section strips securely assembled relative to each other during the welding operation and to exert pressure on the flanges of the strips to eliminate permanent deflection in the completed beam. The apparatus, as shown, comprises a pair of elongated metal strips 16 which are preferably formed of a metal such as copper and which are cross-scored, as indicated at 17, to provide longitudinal flexibility in the strips without permanent bending and without offering too much resistance. The metal strips 16 are connected together in such a way that they are held against relative lateral movement, but can move toward and away from each other perpendicular to the planes of the strips. At one end, the strips are connected by flexible metal straps 18 which are secured to the ends of the strips 16 and are bent inward to be connected to each other by means, such as a rivet 19. The straps 18 may be utilized for pulling the apparatus through a pair of channel-shaped strips and for pulling the apparatus out of the completed beam after welding, as well as serving to hold the strips 16 against relative lateral movement.

At the opposite end, as shown in FIGURE 2, each of the strips 16 has riveted, or otherwise secured thereto, a U-shaped member 21 with the legs of the U-shaped member 21 on opposite strips facing each other. Flattened sleeves 22 fit slidably over the legs of the strips 21 to hold them against lateral movement, but to permit relative separation of the strips 16.

Between the strips 16 there are arranged a series of strips 23 of a heat insulating material, such as wood. In a preferred construction, the strips 23 may be strips of standard plywood and one or more such strips may be used as required depending upon the width of the beam to be formed. These strips 23 thus serve not only as heat insulating elements, but also as shims to enable the apparatus to be adjusted to the required size.

Between the insulating strips 23 there is arranged an inflatable member which will urge the strips apart and which will press the metal strips 16 into tight engagement with the flanges of the channel section strips 11 and 12. As shown, the inflatable member is in the form of a conventional elongated hose 24 which is closed at one end by a clamp 25 and which is provided at its other end with a nipple 26 for connection to a source of air or other fluid under pressure. In the normal condition of the apparatus, the hose is flattened, as shown in FIGURE 3, so that when pressure is applied the hose tends to assume a round condition and exerts pressure outwardly against the insulating strips 23 and the metal strips 16. In a normal operation for welding channel section strips of ¼ inch steel, a pressure of about 90 pounds per square inch is applied to the hose 24 to exert a relatively high pressure against the flanges 14 of the channel section strips during the welding operation.

To hold the various strips and the hose assembled guide plates are provided, as shown at 27, which loosely overlie the edges of the strips and the hose. The guide plates 27, as shown, may be attached in recesses at spaced points to the metal strips 16 so that they do not project beyond the edges of strips 16 and extend inwardly therefrom over the outer edges of the insulating strips 23 and over the hose. With these plates secured to the metal strips 16, as shown, lateral displacement of the insulating strips and of the hose is prevented without interfering with expansion of the assembly when pressure is applied to the hose.

For further supporting the various strips and hose assembly, especially when it is outside of the tube, rectangular rings, as shown at 31 may be fitted slidably around the assembly in engagement with the outer edge portions and sides of the strips 16. These ring members will hold the various strips in assembled position and when the assembly is to be inserted in a tube they will slide over the assembly and stack up at one end of the tube, as partially illustrated in FIGURE 2. As the assembly is removed from a completed tube, the rings may be easily slipped back over it to hold the parts in position while they are stored.

To weld a beam according to the present invention, the two channel section strips 11 and 12 are placed together with the edges of their flanges spaced slightly apart on the order of 3/32 inch to provide for 100% penetration of the welded seam. The flanges may be butted tightly together when full penetration of the welded seam is not required. The assembly of metal strips, insulating strips and hose is then pulled into the channel section strips with the metal strips 16 spanning the seams between their flanges. Preferably, the strips 16 are formed with elongated grooves 28 registering with seams between the flanges to provide space for venting gases generated during the welding operation. Pressure is then supplied to the hose 24 to expand it and to press the metal strips 16 tightly against the flanges 14 of the channel section strips. The assembly is now ready for welding.

A seam weld 15 is welded along one of the seams by conventional welding methods with the apparatus of the present invention in place and with pressure applied to the hose. During the initial welding the beam will deflect to approximately the same extent as in welding by conventional methods. That is to say, in a 24 foot beam of ¼ inch steel there will be a total deflection on the order of 1½ inch to 2 inches. After welding of the initial seam the beam is reversed and the seam on the opposite side is welded with the pressure being maintained. It has been found that when the pressure is maintained during the complete welding operation, 100% recovery of the initial deflection is obtained so that the final completed beam is straight. The exact reason for this is not clear at the present time, but experience has demonstrated that it occurs time after time with the result that straight welded beams are produced without the necessity of any prestressing. Furthermore, the metal strips 16 pressed tightly against the flanges 14 hold these flanges in exact alignment so that the final completed beams are extremely uniform and may in most cases be used without any additional finishing operations, except for rustproofing or decoration.

While the invention has been described in connection with one particular method and apparatus, it will be understood that these are for the purpose of illustration only and are not to be taken as a definition of the scope of the invention, reference being had for this purpose to the appended claims.

What is claimed is:

1. The method of welding relatively long channel section strips to form a box section beam which comprises fitting a pair of channel section strips with their flanges in facing alignment to define a box section beam with elongated seams on opposite sides thereof, exerting a uniform pressure outwardly from the interior of the beam on the flanges on opposite sides of and adjacent to the seams along the full length thereof, welding one of the seams and thereafter welding the other seam while maintaining said pressure to effect recovery of initial deflection occasioned by the first weld whereby a substantially straight beam is produced.

2. The method of welding relatively long channel section strips to form a box section beam which comprises fitting a pair of channel section strips with their flanges in facing alignment to define a box section beam with elongated seams on opposite sides thereof, applying a resilient fluid pressure to the flanges from the interior of the box section adjacent to and along the full length of the seams, welding one of the seams, and thereafter welding the other seam while maintaining said pressure to effect recovery of initial deflection occasioned by the first weld whereby a substantially straight beam is produced.

3. Apparatus for welding channel section strips to form a rectangular box section beam having welded seams joining the flanges of the strips and lying centrally of opposed faces of the beam comprising a pair of elongated parallel flat metal strips to fit within the box section beam against the flanges of the channel section strips at opposite sides of the beam and spanning the seam therebetween, said metal strips being cross-scored for flexibility and having elongated grooves in their outer surfaces registering with the seams between the channel section strips to vent gas therefrom, elongated wood spacer strips lying against the inner surfaces of the metal strips, an inflatable tube between the spacer strips to urge them apart thereby to press the metal strips into engagement with the flanges of the channel section strips, and guide means connecting the metal strips to prevent relative lateral movement parallel to the planes thereof while allowing relative movement normal to the planes thereof.

References Cited in the file of this patent

UNITED STATES PATENTS

| | | |
|---|---|---|
| 873,116 | Ashenberg | Dec. 10, 1907 |
| 1,846,438 | Richter et al. | Feb. 23, 1932 |
| 2,004,787 | Gillette | June 11, 1935 |
| 2,031,863 | Snell | Feb. 25, 1936 |
| 2,245,789 | Klavik | June 17, 1941 |
| 2,407,331 | Van Velzer | Sept. 10, 1946 |
| 2,517,461 | Carlile | Aug. 1, 1950 |
| 2,685,629 | Peck | Aug. 3, 1954 |
| 2,734,120 | Sensenig | Feb. 7, 1956 |
| 2,792,799 | Dahlstrom | May 21, 1957 |